United States Patent
Holmes et al.

(10) Patent No.: US 9,803,448 B2
(45) Date of Patent: Oct. 31, 2017

(54) SIL RATED SYSTEM FOR BLOWOUT PREVENTER CONTROL

(71) Applicant: Hydril USA Distribution LLC, Houston, TX (US)

(72) Inventors: John S. Holmes, Houston, TX (US); Douglas Milliman, Houston, TX (US); Luis Huerta, Houston, TX (US)

(73) Assignee: HYDRIL USA DISTRIBUTION, LLC, Houston, TX (US)

( * ) Notice: Subject to any disclaimer, the term of this patent is extended or adjusted under 35 U.S.C. 154(b) by 0 days.

(21) Appl. No.: 14/870,249

(22) Filed: Sep. 30, 2015

(65) Prior Publication Data
US 2016/0090810 A1 Mar. 31, 2016

Related U.S. Application Data

(60) Provisional application No. 62/057,586, filed on Sep. 30, 2014, provisional application No. 62/067,829, filed on Oct. 23, 2014.

(51) Int. Cl.
*E21B 33/064* (2006.01)
*G05B 11/01* (2006.01)
*E21B 34/16* (2006.01)

(52) U.S. Cl.
CPC ............ *E21B 33/064* (2013.01); *E21B 34/16* (2013.01); *G05B 11/01* (2013.01)

(58) Field of Classification Search
CPC .... E21B 33/064; E21B 34/16; E21B 33/0355; E21B 33/061
See application file for complete search history.

(56) References Cited

U.S. PATENT DOCUMENTS

| 3,902,554 A | 9/1975 | Hooper |
| 4,109,938 A | 8/1978 | Mitchell et al. |

(Continued)

FOREIGN PATENT DOCUMENTS

| CN | 201250646 Y | 6/2009 |
| WO | 0001915 A2 | 1/2000 |
| WO | 2013192494 A1 | 12/2013 |

OTHER PUBLICATIONS

John Steven Holmes, Oct. 15, 2015, U.S. Appl. No. 14/884,563.

(Continued)

*Primary Examiner* — James G Sayre
(74) *Attorney, Agent, or Firm* — Hogan Lovells US LLP (57) ABSTRACT

A control system for a subsea blowout preventer (BOP) positioned in a lower stack, the lower stack releasably engaged with a lower marine riser package (LMRP). The control system includes a surface logic solver positioned at or adjacent the surface of the sea that generates commands for operating the subsea BOP, a first subsea logic solver attached to the LMRP and in communication with the surface logic solver so that the first subsea logic solver receives the commands from the surface logic solver, and a second subsea logic solver attached to a hydraulic control unit in the lower stack. The second subsea logic solver is in hydraulic communication with the subsea BOP, and the first subsea logic solver so that the second subsea logic solver receives the commands from the first subsea logic solver and implements the commands by activating the hydraulic control unit to operate the BOP.

18 Claims, 3 Drawing Sheets

(56) References Cited

U.S. PATENT DOCUMENTS

| | | | |
|---|---|---|---|
| 4,618,173 | A | 10/1986 | Dopyera et al. |
| 4,709,726 | A | 12/1987 | Fitzgibbons |
| 5,314,024 | A | 5/1994 | Rodgers et al. |
| 5,778,918 | A | 7/1998 | McLelland |
| 5,781,192 | A | 7/1998 | Kodimer |
| 5,867,150 | A | 2/1999 | Bricklin et al. |
| 6,040,969 | A | 3/2000 | Winch et al. |
| 6,041,804 | A | 3/2000 | Chatufale |
| 6,835,292 | B2 | 12/2004 | Sato et al. |
| 6,957,205 | B1 | 10/2005 | Liongosari |
| 6,961,226 | B2 | 11/2005 | Mason, Jr. et al. |
| 6,990,498 | B2 | 1/2006 | Fenton et al. |
| 7,000,890 | B2 | 2/2006 | Bell et al. |
| 7,111,874 | B2 | 9/2006 | Smith, III |
| 7,113,668 | B2 | 9/2006 | Sorum et al. |
| 7,216,715 | B2 | 5/2007 | Reynolds |
| 7,218,997 | B2* | 5/2007 | Bassett ............... E21B 34/16 700/286 |
| 7,261,162 | B2 | 8/2007 | Deans et al. |
| 7,337,848 | B2 | 3/2008 | Fraser et al. |
| 7,558,684 | B2 | 7/2009 | Patten et al. |
| 7,571,772 | B2 | 8/2009 | Reams |
| 7,760,670 | B2 | 7/2010 | Causier |
| 7,832,706 | B2 | 11/2010 | Judge |
| 7,849,599 | B2 | 12/2010 | Huff et al. |
| 7,887,103 | B2 | 2/2011 | Evans et al. |
| 7,913,767 | B2 | 3/2011 | Larson et al. |
| 7,975,770 | B2 | 7/2011 | Keener |
| 8,020,623 | B2 | 9/2011 | Parks et al. |
| 8,054,593 | B2 | 11/2011 | Reid et al. |
| 8,157,025 | B2 | 4/2012 | Johnson |
| 8,157,295 | B2 | 4/2012 | Krywitsky |
| 8,230,735 | B2 | 7/2012 | Chouzenoux et al. |
| 8,322,436 | B2 | 12/2012 | Maa |
| 8,388,255 | B2 | 3/2013 | Larson et al. |
| 8,403,053 | B2 | 3/2013 | Judge |
| 8,464,797 | B2 | 6/2013 | Singh et al. |
| 8,469,048 | B2 | 6/2013 | Bresnahan |
| 8,602,108 | B2 | 12/2013 | Mathis |
| 8,640,775 | B2* | 2/2014 | Kotrla ............... E21B 33/035 166/338 |
| 8,708,054 | B2 | 4/2014 | Dailey, Jr. |
| 8,724,957 | B2 | 5/2014 | Oisel et al. |
| 8,781,743 | B2 | 7/2014 | McKay |
| 8,812,274 | B2 | 8/2014 | Virkar et al. |
| 8,944,403 | B2 | 2/2015 | Jurena et al. |
| 9,057,751 | B2 | 6/2015 | Spencer et al. |
| 9,085,948 | B2 | 7/2015 | Egeland |
| 9,151,794 | B2 | 10/2015 | Radan |
| 9,322,264 | B2* | 4/2016 | Gutierrez ............... E21B 33/063 |
| 9,439,316 | B2* | 9/2016 | Wijekoon ............... E21B 41/0007 |
| 2003/0102720 | A1* | 6/2003 | Baggs ............... E21B 33/0355 307/149 |
| 2010/0300696 | A1 | 12/2010 | McCalvin et al. |
| 2011/0266002 | A1 | 11/2011 | Singh et al. |
| 2012/0233128 | A1 | 9/2012 | Solmer |
| 2012/0312546 | A1 | 12/2012 | Bussear et al. |
| 2012/0318517 | A1 | 12/2012 | Christensen et al. |
| 2013/0054034 | A1 | 2/2013 | Ebenezer |
| 2013/0118755 | A1 | 5/2013 | Kotrla et al. |
| 2013/0253872 | A1 | 9/2013 | Curtis et al. |
| 2013/0255956 | A1 | 10/2013 | Gilmore et al. |
| 2013/0283919 | A1 | 10/2013 | Coonrod et al. |
| 2014/0061516 | A1 | 3/2014 | Gustafson et al. |
| 2014/0064029 | A1* | 3/2014 | Jaffrey ............... E21B 33/0355 367/81 |
| 2014/0321341 | A1 | 10/2014 | Kristiansen |
| 2014/0361785 | A1 | 12/2014 | Radan |
| 2015/0015066 | A1 | 1/2015 | Dong et al. |
| 2015/0041122 | A1 | 2/2015 | Valsecchi |
| 2015/0101674 | A1 | 4/2015 | Gustafson |
| 2015/0129233 | A1 | 5/2015 | Gaude et al. |
| 2015/0184505 | A1 | 7/2015 | Panicker-Shah |
| 2015/0198001 | A1 | 7/2015 | McWhorter |
| 2015/0233202 | A1 | 8/2015 | Caldwell et al. |
| 2015/0260203 | A1 | 9/2015 | Launonen et al. |

OTHER PUBLICATIONS

John Steven Holmes et al., Oct. 15, 2015, U.S. Appl. No. 14/884,563.
John S. Holmes et al., Nov. 11, 2015, U.S. Appl. No. 14/938,074.
Alex David Stibich et al., Dec. 9, 2015, U.S. Appl. No. 14/963,849.
Glen Allen Scott et al., Dec. 17, 2015, U.S. Appl. No. 14/972,848.
Michael James Connor et al., Dec. 16, 2015, U.S. Appl. No. 14/971,381.
William James Hatter et al., Dec. 17, 2015, U.S. Appl. No. 14/972,266.
Thomas David Beales et al., Dec. 16, 2015, U.S. Appl. No. 14/971,669.
Thomas David Beales et al., Dec. 16, 2015, U.S. Appl. No. 14/971,305.
Alexander Michael Mcauley et al., Nov. 11, 2015, U.S. Appl. No. 14/938,599.
McCord, "A Multiplex System for a Small Remotely Manned Submersible", IEEE Ocean 1975, pp. 361-364, 1975.
Hickok, "Practical Experience of Control Valve Behavior", Subsea Control and Data Acquisition: Proceedings of an International conference, London, UK, pp. 195-203, Apr. 4-5, 1990.
Martin et al., "A Proven Oil/Water/Gas Flowmeter for Subsea, Offshore Technology Conference", Offshore Technology Conference, Houston, pp. 589-596, May 6-9, 1991.
Ali et al., "Subsea Valve Actuator for Ultra Deepwater", Offshore Technology Conference, Houston, Texas, 1996 proceedings, pp. 799-809, May 6-9, 1996.
Altamiranda et al., "Intelligent Supervision and Integrated Fault Detection and Diagnosis for Subsea Control Systems", OCEANS 2007 Europe, pp. 1-6, Jun. 18-21, 2007.
Wang et al., "Water Hammer Effects on Water Injection Well Performance and Longevity", Society of Petroleum Engineers, SPE International Symposium and Exhibition on Formation Damage Control,Lafayette, Louisiana, USA, pp. 1-10, Feb. 13-15, 2008.
Vetcogray, "Capital Drilling Equipment", Retrieved from http://site.ge-energy.com/businesses/ge_oilandgas/en/literature/en/downloads/capital_drilling_equipment.pdf, pp. 1-15, 2008.
Altamiranda et al., "Condition Monitoring and Diagnosis for Subsea Control Systems. A Subsystem Prototype", OCEANS 2009 Europe, pp. 1-6, May 11-14, 2009.
Whitby et al., "20KSI BOP Stack Development", SPE International, pp. 1-5, Feb. 2-4, 2010.
Tang et al., "A Dynamic Simulation Study of Water Hammer for Offshore Injection Wells to Provide Operation Guidelines", SPE Production & Operations, vol. No. 25, Issue No. 4, pp. 509-523, Nov. 2010.
Shanks et al., "OTC 23473 New Generation Control System for 20 KSI Subsea BOP", Offshore Technology Conference, pp. 1-12, May 3, 2012.
Levine et al., "BSEE and BOEM Workshop with Government of Israel, Application for Permit to Drill", pp. 1-40, Jul. 24, 2012.
Cai et al., "Reliability Analysis of Subsea Blowout Preventer Control Systems Subjected to Multiple Error Shocks", Journal of Loss Prevention in the Process Industries, vol. No. 25, Issue No. 6, pp. 1044-1054, Nov. 1, 2012.
Cai et al., "Application of Bayesin Networks to Reliability Evaluation of Software Systems for Subsea Blowout Preventers", International Journal of Control and Automation, pp. 47-60, Feb. 28, 2013.
Umofia., "Risk-Based Reliability Assessment of Subsea Control Module for Offshore Oil and Gas production", Cranfield University, School of Engineering, Department of Offshore, Process and Energy Engineering, pp. 1-284, Sep. 2014.
Chazal et al., "Enhancements in Fraction Measurements and Flow Modeling for Multiphase Flowmeters" Society of Petroleum Engineers, SPE Annual Technical Conference and Exhibition, pp. 1-19, Oct. 27-29, 2014.

(56) References Cited

OTHER PUBLICATIONS

PCT Search Report and Written Opinion issued in connection with corresponding Application No. PCT/US2015/053238 dated Feb. 1, 2016.
PCT Search Report and Written Opinion issued in connection with related Application No. PCT/US2015/055915 dated Feb. 2, 2016.
GE Oil & Gas, "GE's 20-ksi" BOP Completely Re-Engineered to Meet Demands of HPHT Reservoirs, Drilling Contractor, pp. 1-2, Feb. 17, 2016.
Cameron., "Mark III Subsea MUX BOP Control System", Drilling Pressure Control Equipment, Retrieved from http://www.c-a-m.com/products-and-services/drilling/drilling-pressure-control-equipment/mark-iii-subsea-mux-bop-control-system, pp. 1-4, Feb. 19, 2016.

* cited by examiner

SIL RATED SYSTEM FOR BLOWOUT PREVENTER CONTROL

CROSS-REFERENCE TO RELATED APPLICATIONS

This application claims priority to U.S. Provisional Patent Appln. No. 62/057,586, which was filed on Sep. 30, 2014, and to U.S. Provisional Patent Appln. No. 62/067,829, which was filed on Oct. 23, 2014, the full disclosures of which are hereby incorporated herein by reference in their entirety.

BACKGROUND OF THE INVENTION

1. Field of the Invention

Embodiments disclosed herein relate generally to control systems for subsea blow out preventers (BOPs). In particular, embodiments disclosed herein relate to systems for providing backup or augmented functions in addition to a BOP control system.

2. Brief Description of Related Art

Subsea drilling for oil and gas typically involves the use of a vessel, which can be, for example, a drill ship or a platform, on the surface of the sea, with a riser extending to near the sea floor. The bottom end of the riser is attached to a lower marine riser package, which contains, among other things, control pods intended to control components of the drilling system near the sea floor. Below the riser is typically positioned a lower stack, which includes a blowout preventer (BOP) mounted to a wellhead. The drilling pipe extends from the vessel at the sea surface, through the riser to the bottom of the sea, through the BOP, and through the wellhead into a wellbore to the oil producing formation.

One purpose of the BOP is to act as a failsafe mechanism to prevent oil and gas from escaping from the wellbore into the environment. To accomplish this task, the BOP typically includes a plurality of rams. Some rams have elastomeric seals and are designed to close around the drill pipe if needed to seal the annulus around the pipe. That way, if an unexpected pressure surge tries to force oil and gas from the wellbore through the annulus, the BOP can close to prevent a spill. Other rams are known as shearing rams, including blind shear rams, and are designed to cut through drill pipe and other items extending into the wellbore to completely seal the wellbore from the surrounding environment.

Because of the safety functions played by the BOP in a subsea drilling operation, it is necessary to ensure that all BOP control systems and components are functioning properly, and to provide redundant backup systems in case of a failure. Accordingly, added redundancy and monitoring capability, such as in the form of a safety instrumented system, is beneficial.

In addition, as subsea drilling extends into deeper waters, pressures at the sea floor, where the BOP is located, increase. With higher pressures, there are greater consequences if a well leaks, and the BOPs themselves require design modifications to ensure safety. Accordingly, new safety instrumented systems for backing up the BOP control system, as well monitoring its function, are needed.

SUMMARY OF THE INVENTION

One aspect of the present invention provides a control system for a subsea blowout preventer (BOP) positioned in a lower stack, the lower stack releasably engaged with a lower marine riser package (LMRP). The control system includes a surface logic solver positioned at or adjacent the surface of the sea that generates commands for operating the subsea BOP, a first subsea logic solver attached to the LMRP and in communication with the surface logic solver so that the first subsea logic solver receives the commands from the surface logic solver, and a second subsea logic solver attached to a hydraulic control unit in the lower stack. The second subsea logic solver is in hydraulic communication with the subsea BOP, and the first subsea logic solver so that the second subsea logic solver receives the commands from the first subsea logic solver and implements the commands by activating the hydraulic control unit to operate the BOP.

In some embodiments, the lower stack can be attached to the LMRP by a hydraulic connector, and the hydraulic control unit can control the hydraulic connector. In other embodiments, the lower stack can be attached to the LMRP by a hydraulic connector, and the hydraulic connector can be powered by an accumulator.

In certain embodiments, the surface logic solver, the first subsea logic solver, and the second subsea logic solver, can each comprise a central processing unit (CPU). In other embodiments, the surface logic solver can comprise a central processing unit (CPU), and the first subsea logic solver or the second subsea logic solver, or both, can comprise an extended input/output (I/O) card.

In some embodiments, the surface logic solver can be connected to the first subsea logic solver by a cable having high voltage wires and optical communication lines, and the first subsea logic solver can be connected to the second subsea logic solver by a cable having low voltage wires and no optical communication lines. In addition, the system can further include an acoustic pod in communication with and controllable by the second subsea logic solver.

In alternate embodiments, the system can further include a human machine interface panel connected to the surface logic solver, and an automatic controller in communication with the surface logic solver that automatically issues commands to the surface logic solver based on predetermined conditions detected by the surface logic solver. In such an embodiment, the system can also have a key switch having a first position and a second position, the first position opening communication between the surface logic solver and the human machine interface panel, and the second position opening communication between the surface logic solver and the automatic controller.

Another aspect of the present invention provides a redundant control system for a subsea BOP positioned in a lower stack, the lower stack removably engaged with an LMRP, and the LMRP having first and second control pods, each in hydraulic communication with the BOP to control the BOP. The system includes a surface logic solver positioned at or adjacent the surface of the sea that generates commands for operating the subsea BOP, and a first subsea logic solver attached to the first control pod and in communication with the surface logic solver, the first subsea logic solver in communication with the first control pod so that the first subsea logic solver is capable of receiving commands from the surface logic solver and implementing the commands by activating the first control pod to operate the BOP. In addition, the system includes a second subsea logic solver attached to the second control pod and in communication with the surface logic solver, the second subsea logic solver in communication with the second control pod so that the second subsea logic solver is capable of receiving commands from the surface logic solver and implementing the commands by activating the second control pod to operate the BOP.

In some embodiments, the lower stack can be attached to the LMRP by a hydraulic connector, and the hydraulic connector can be in communication with the first subsea logic controller and the second subsea logic controller. In other embodiments, the lower stack can be attached to the LMRP by a hydraulic connector, and the hydraulic connector can be powered by an accumulator.

In certain embodiments, the surface logic solver, the first subsea logic solver, and the second subsea logic solver, can each comprise a CPU. In other embodiments, the surface logic solver can comprise a CPU, and the first subsea logic solver or the second subsea logic solver, or both, can comprise an extended I/O card. In addition, control system can further include an acoustic pod in communication with and controllable by the first subsea logic solver and the second subsea logic solver.

In alternate embodiments, the system can further include a human machine interface panel connected to the surface logic solver, and an automatic controller in communication with the surface logic solver that automatically issues commands to the surface logic solver based on predetermined conditions detected by the surface logic solver. In such an embodiment, the system can also have a key switch having a first position and a second position, the first position opening communication between the surface logic solver and the human machine interface panel, and the second position opening communication between the surface logic solver and the automatic controller.

Yet another aspect of the present technology provides a method for controlling a subsea blowout preventer (BOP). The method includes the steps of generating a command signal in a surface logic solver located at or adjacent the surface of the sea, transmitting the command signal to a first subsea logic solver attached to a lower marine riser package, transmitting the command signal to a second subsea logic solver attached to a hydraulic control unit in a lower stack, the hydraulic control unit in communication with the subsea BOP, operating the subsea BOP with the hydraulic control unit in accordance with the command signal.

In some embodiments, the first transmitting step between the surface logic solver and the first subsea logic solver can be carried out via an optical cable between the surface logic solver and the first subsea logic solver. Similarly, the second transmitting step between the first logic solver and the second logic solver can be is carried out via a copper wire between the first subsea logic solver and the second subsea logic solver. In some embodiments, the first subsea logic solver can convert the command signal from an optical signal to a copper signal.

BRIEF DESCRIPTION OF THE DRAWINGS

The present technology will be better understood on reading the following detailed description of nonlimiting embodiments thereof, and on examining the accompanying drawings, in which.

DETAILED DESCRIPTION OF THE PREFERRED EMBODIMENT

The foregoing aspects, features, and advantages of the present technology will be further appreciated when considered with reference to the following description of preferred embodiments and accompanying drawings, wherein like reference numerals represent like elements. The following is directed to various exemplary embodiments of the disclosure. The embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment.

Safety Instrumented System for Use on Stack Wide Basis

Figure 1:
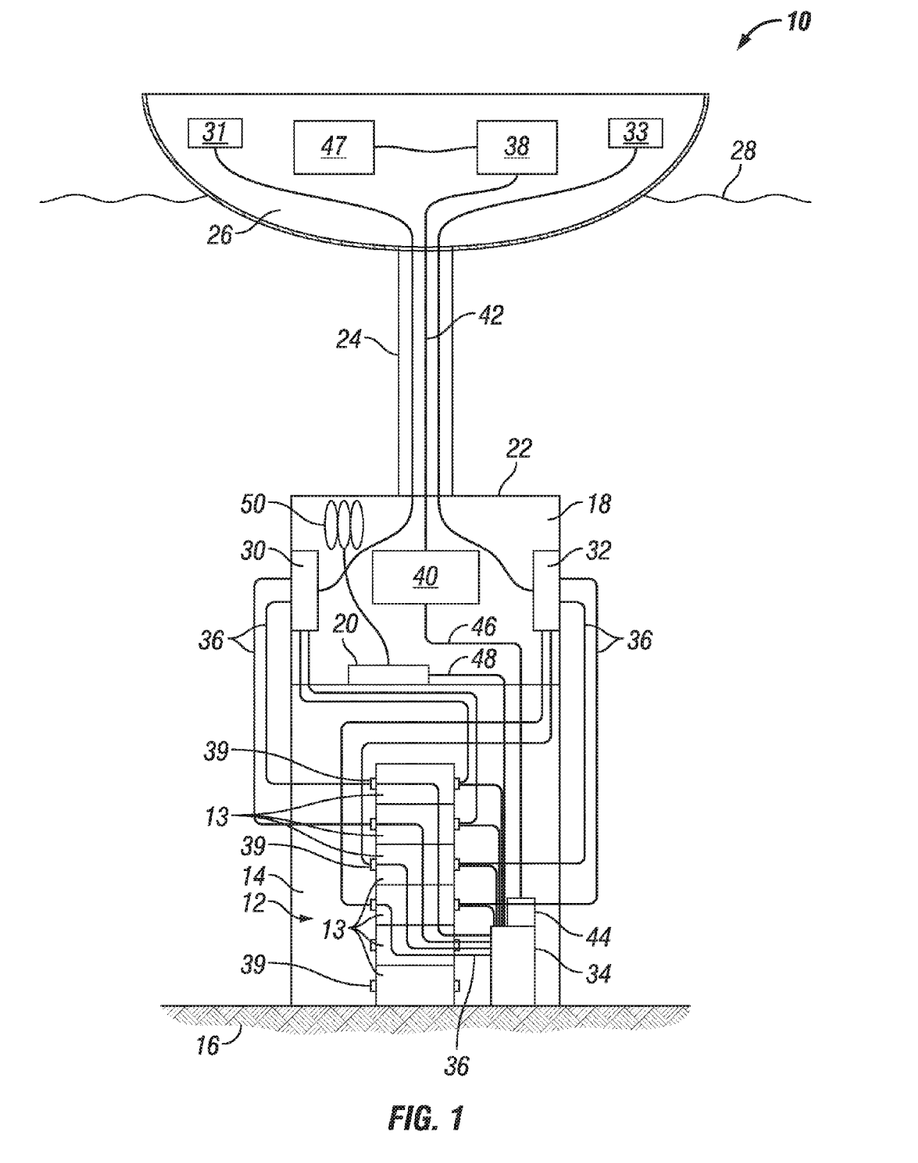
FIG. 1 shows a side schematic view of a safety instrumented system according to an embodiment of the present technology.

FIG. 1 shows a system 10 for controlling a subsea blowout preventer (BOP) 12. The subsea BOP 12 is typically housed in a lower stack 14 positioned on the sea floor 16 below a lower marine riser package (LMRP) 18. The subsea BOP 12 is divided into individual BOP rams 13, which can include sealing rams, shear rams, etc. The lower stack 14 and the LMRP 18 can be connected to one another by a hydraulic connector 20, which can be controlled to allow disengagement of the LMRP 18 from the lower stack 14. An upper end 22 of the LMRP 18 is connected to a riser 24 that extends from the upper end 22 of the LMRP 18 to a vessel 26 at the surface 28 of the sea. Also included in the system can be a first control pod 30 (often referred to as the yellow control pod) and a second control pod 32 (often referred to as the blue control pod). In the embodiment shown in FIG. 1, the first and second control pods 30, 32 are attached to the LMRP 18. The first control pod 30 and second control pod 32 can be controlled by first and second control cabinets 31, 33, located on the vessel 26. The vessel 26 can be any appropriate vessel, including, for example, a drill ship or a platform.

Under normal operations, the subsea BOP rams 13 are hydraulically controlled by the first or second pod 30, 32. Specifically, hydraulic lines 36 run from each of the first and second control pods 30, 32 to individual rams 13 of the BOP 12. Typically one of the two control pods 30, 32 is responsible to hydraulically control the rams 13 through its respective hydraulic lines 36, while the other control pod 30, 32 remains idle. In this way, redundancy is built into the system because if the control pod 30, 32 actually controlling the rams 13 becomes incapacitated, or otherwise requires maintenance or replacement, the other control pod 30, 32 can continue operation of the rams 13.

One embodiment of the present technology includes a safety instrumented system for controlling the subsea BOP 12 on a stack wide basis. One purpose of such a system is to provide the appropriate safety instrumented functions to confirm and backup the BOP control system, and comply with certain regulatory standards applicable to many systems and sub-systems in the petroleum industry. The safety instrumented system includes a surface logic solver 38, or logic controller, located at the vessel 26, and connected to a first subsea logic solver 40 by a first cable 42. The first subsea logic solver 40 is in turn connected to a second subsea logic solver 44 by a second cable 46. As shown in FIG. 1, the second subsea logic solver 44 can be connected to a hydraulic control unit 34 located in the lower stack 14. In some embodiments, the second subsea logic solver 44 can be connected to a battery, so that the second subsea logic solver 44 can continue to operate after the LMRP 18 has been disconnected from the lower stack 14. The surface logic solver 38 can include a human machine interface (HMI) panel 47 to allow an operator to communicate with the surface logic solver 38.

In practice, the surface logic solver 38 can generate commands, which are then transmitted to the first subsea logic solver 40 via the first cable 42. From the first subsea logic solver 40, the commands are then transferred to the second subsea logic solver 44, which communicates with, and may be attached to, the hydraulic control unit 34. The hydraulic control unit 34 is in turn in communication with the subsea BOP rams 13 via hydraulic lines 36. The second subsea logic solver 44 can implement the commands, directing the hydraulic control unit 34 to control the subsea BOP rams 13 as desired by an operator. The logic solvers 38, 44, 40 of any embodiment described herein can be any equipment capable of sending and receiving signals according to the requirements of the technology. For example, in some embodiments, the logic solvers can comprise or include central processing units (CPUs).

In the embodiment shown, each ram 13 can be connected to multiple hydraulic lines 36, each coming from a different control source, including the first control pod 30, the second control pod 32, and the hydraulic control unit 34. As shown, which line controls the BOP ram 13 at any given moment can be controlled by valves 39 attached to the BOP rams 13. In the drawings, hydraulic lines 36 are shown connecting each of the first and second control pods 30, 32 and the hydraulic control unit 34 to some, but not all, of the rams 13. It is to be understood that in a functioning system, each of the control components can be connected to all of the rams 13, and such a configuration is not shown in the drawing only to improve clarity of the figures.

One benefit of the safety instrumented system described above is that it provides additional redundancy to the system, and acts as a failsafe to enhance safety and reliability of the BOP. Although two control pods 30, 32 are already provided to create some redundancy in the system, in reality it can be difficult to use the second control pod 32 if the first control pod 30 is out of commission. This is because government regulations and best practice procedures dictate that a backup control system always be in place for the BOP. Thus, if the first control pod 30 is unavailable, the second control pod 32 cannot be used because there would be no redundancy. The safety instrumented system herein described helps to alleviate this problem by providing a second redundant control system.

In addition, the safety instrumented system of the present technology can serve to augment the capabilities of the overall system 12 by providing additional means to control the BOP rams 13, even when both control pods 30, 32 are functioning properly. For example, the safety instrumented system, via the hydraulic control unit 34, can control certain rams 13 at the same time that the control pods 30, 32 are controlling alternate rams 13. Thus, the capacity of the system 12 to control the BOP rams 13 is increased. Furthermore, the system can provide monitoring functions, such as monitoring various states, statuses, parameters, etc., as well as information to determine whether the BOP control system is operating properly. The technology can also be designed to comply with the requirement of high pressure drilling operations, and can be used, for example, with a 20 ksi BOP system, although it is not limited to such systems, and may be used in other types of systems as well, such as 15 ksi systems. In addition, the safety instrumented system, as described herein, is a different type of control system than the primary control system, thereby providing the additional advantage of increasing the diversity of the control architecture.

Some benefits of the present technology will now be described. In order to understand the benefits, however, it is first important to understand some of the requirements of offshore drilling systems, one of which is to allow disconnection and subsequent reconnection of the LMRP 18 from the lower stack 14. This can be beneficial, for example, when a hurricane or other storm threatens a drilling vessel or platform. To weather such a storm, an operator may wish to disconnect the LMRP 18 from the lower stack 14, and move the LMRP 18, riser 24 and vessel 26 out of harm's way. After the storm passes, it is necessary to then reconnect the LMRP 18 to the lower stack 14 to resume operations. The disconnection and subsequent reconnection of the LMRP 18 to the lower stack 14 can be greatly simplified by reducing the number of connections between these components, and also by controlling the types of connections made.

One way to simplify the reconnection of the LMRP 18 and the lower stack 14 is to provide a pair of subsea logic solvers, as shown in FIG. 1 and described above. This is because the first cable 42, which connects the surface logic solver 38 to the first subsea logic solver 40 must carry power and communications between these two components. Often, the distance between the surface logic solver 38 and the LMRP 18 (and thus the first subsea logic solver 40) through the riser 24 can be very long, such as up to about 2 miles in length or more. Thus, power lines in the cable must be relatively high voltage lines, and the communications are often carried through optical lines (although copper lines may be used).

If the system were equipped with a single subsea logic solver in the lower stack, an operator would need to disconnect and reconnect both higher voltage power lines and fragile optical communications lines between the LMRP 18 and the lower stack 14. Such connections could be dangerous (in the case of the high voltage power lines) and could degrade the quality of the communication signals (in the case of the optical communications lines). Alternatively, if the system were equipped only with a single subsea logic solver on the LMRP 18, multiple hydraulic lines would need to cross from the LMRP 18 to the lower stack 14 to connect to the rams 13. Such a structure could be problematic because of the need to disconnect and reconnect many more lines between these components.

By providing two separate subsea logic solvers 40, 44, including one on the LMRP 18 and one on the lower stack 14, these problems can be alleviated. In practice, according to the present technology, the cable 42 connecting the surface logic solver 38 to the first subsea logic solver 40 can include high voltage power lines and optical communication lines. One function of the first subsea logic solver 40 can be to convert and lower the voltages, and to convert the optical signals to copper, thereby allowing communication between the first subsea logic solver 40 and the second subsea logic solver 44 to be through low voltage copper wires that make up cable 46. Such low voltage copper wire can more easily be disconnected and reconnected as needed at the interface between the LMRP 18 and the lower stack 14.

In some embodiments of the invention, the hydraulic control unit 34 can be connected to the hydraulic connector 20 to disconnect or reconnect the LMRP 18 from the lower stack 14. Since the hydraulic connector 20 is attached to the LMRP 18, a single hydraulic line 48 may need to cross the interface between the LMRP 18 and the lower stack 14 to provide hydraulic communication between the hydraulic control unit 34 and the hydraulic connector 20. Alternatively, use of such a line can be avoided in favor of providing power to the hydraulic connector 20 from an accumulator 50 which, in the embodiment shown, can be attached to the LMRP 18.

For purposes of explanation, the following paragraphs contain explanations of how the safety instrumented system can work with other existing BOP systems to operate specific features of the BOP or other components on the LMRP and lower stack. It is to be understood that these explanations are given by way of example only, and do not represent all of the possible ways that that the present technology can be applied in practice.

The first example explains an example of the function of the safety instrumented system as it relates to a pipe ram BOP. The pipe ram function may be initiated by any contact closure input, or by an HMI panel. The need to close the ram is determined by the operator, so the initiation of the function is determined by the man-in-the-loop. When the surface logic solver 38 on the vessel 26 recognizes the input, it may monitor a surface flow meter. If the BOP is not successfully closed by the basic process control system (BPCS), the surface logic solver 38 may transmit a signal to the first subsea logic solver 40. The first subsea logic solver 40 may in turn transmit the signal to the second subsea logic solver 44, which may fire a function that vents the open hydraulic pressure to the pipe ram and applies close pressure to the pipe ram, thus closing the BOP.

The second example explains an example of the function of the safety instrumented system as it relates to a blind shear ram. The blind shear ram function may be initiated by a contact closure input, or by an HMI panel. The need to close the ram is determined by the operator, so initiation of the function is determined by the man-in-the-loop. When the surface logic solver 38 on the vessel 26 recognizes the input, it may monitor the surface flow meter. If the BOP is not successfully closed by the BPCS, the surface logic solver 38 may transmit a signal to the first subsea logic solver 40, which may in turn transmit the signal to the second subsea logic solver 44. The second subsea logic solver 44 may fire a function that vents the open hydraulic pressure to the blind shear ram and applies close pressure to the blind shear ram, thus closing the BOP.

The third example explains an example of the function of the safety instrumented system as it relates to a casing shear ram BOP. The casing shear ram function may be initiated by a contact closure input, or by an HMI panel. The need to close the ram is determined by the operator, so initiation of the function is determined by the man-in-the-loop. When the surface logic solver 38 on the vessel 26 recognizes the input, it may monitor the surface flow meter. If the BOP is not successfully closed by the BPCS, the surface logic solver 38 may transmit a signal to the first subsea logic solver 40, which in turn may transmit a signal to the second subsea logic solver 44. The second subsea logic solver 44 may fire a function that vents the open hydraulic pressure to the casing shear ram and applies close pressure to the casing shear ram, thus closing the BOP.

The fourth example explains an example of the function of the safety instrumented system as it relates to the hydraulic connector 20. The hydraulic connector 20 function may be initiated by a contact closure input, or by an HMI panel. The need to release the LMRP is determined by the operator, so initiation of the function is determined by the man-in-the-loop. When the surface logic solver 38 on the vessel 26 recognizes the input, it may monitor the surface flow meter. If the hydraulic connector 20 is not successfully released by the BPCS, the surface logic solver 38 may transmit a signal to the first subsea logic solver 40, which may in turn transmit a signal to the second subsea logic solver 44. The second subsea logic solver 44 may fire a function that vents the latch hydraulic pressure to the hydraulic connector 20 and applies unlatch pressure to both the primary and secondary unlatch functions.

The fifth example explains an example of the function of the safety instrumented system as it relates to an emergency disconnect sequence. The EDS function may be initiated by a contact closure input, or by an HMI panel. The need to disconnect is determined by the operator, so initiation of the function is determined by the man-in-the-loop. When the surface logic solver 38 on the vessel 26 recognizes the input, it may monitor the surface flow meter, or other sensors on the stack, for each function sequentially. If the EDS function is not successfully completed by the BPCS, the surface logic solver 38 may transmit a signal to the first subsea logic solver 40, which in turn may transmit a signal to the second subsea logic solver 44. The subsea logic solver may then fire the following, or another similar sequence, of functions:

Vent the open pressure and apply close pressure to the pipe ram function

Vent the open pressure and apply close pressure to the CSR ram function

Vent the open pressure and apply close pressure to the BSR ram function

Vent the extend pressure and apply the retract pressure to the stab function

Vent the latch pressure and apply primary and secondary unlatch pressure to the LMRP connector function.

Safety Instrumented System for Use on a Pod by Pod Basis

Figure 2:
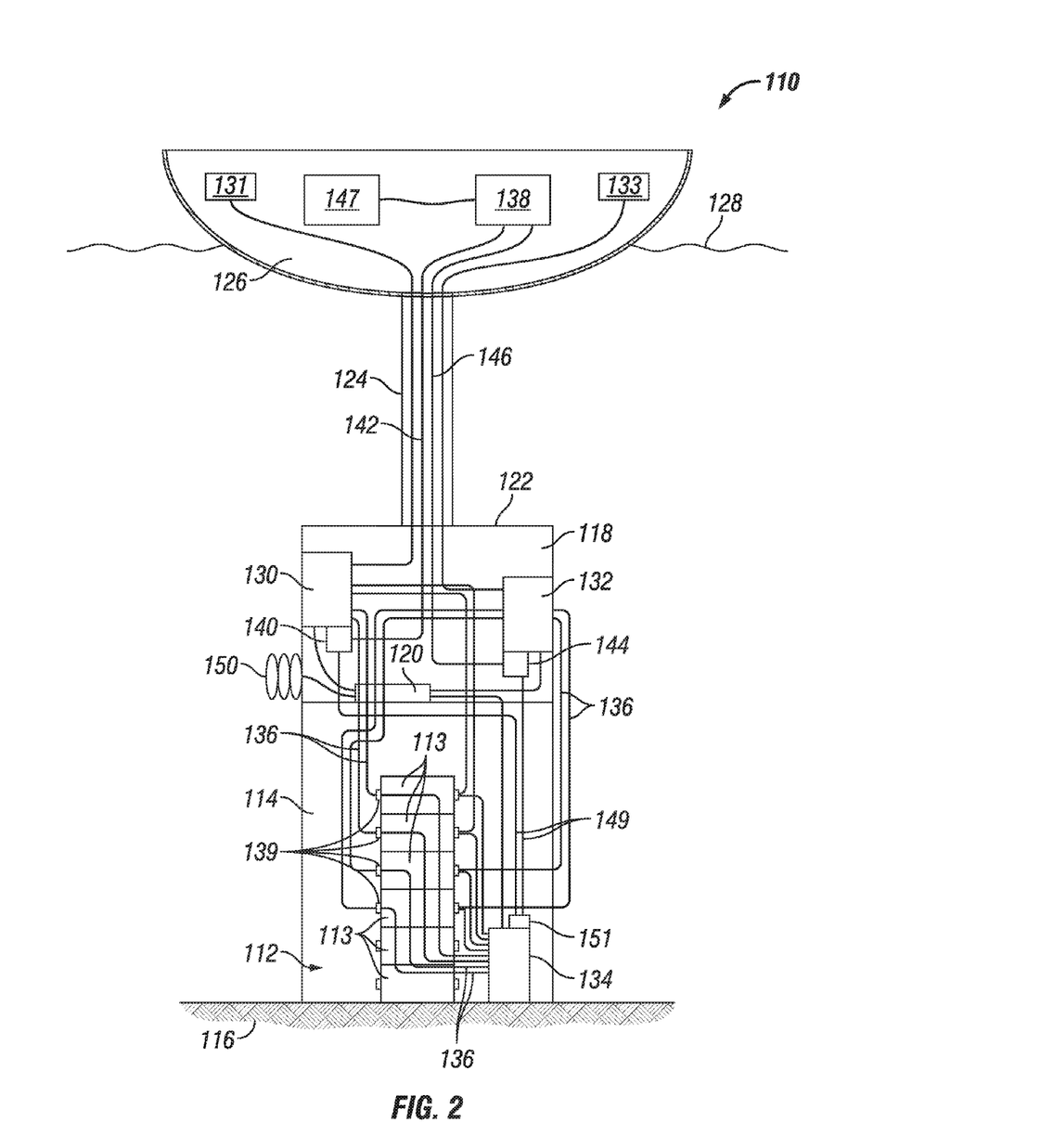
FIG. 2 shows a side schematic view of a safety instrumented system according to an alternate embodiment of the present technology.

Referring now to FIG. 2, there is shown an alternate system 110 for controlling a subsea blowout preventer (BOP) 112. The subsea BOP 112 is typically housed in a lower stack 114 positioned on the sea floor 116 below a lower marine riser package (LMRP) 118. The subsea BOP 112 is divided into individual BOP rams 113, which can include sealing rams, shear rams, etc. The lower stack 114 and the LMRP 118 can be connected to one another by a hydraulic connector 120, which can be controlled to allow disengagement of the LMRP 118 from the lower stack 114. An upper end 122 of the LMRP 118 is connected to a riser 124 that extends from the upper end 122 of the LMRP 118 to a vessel 126 at the surface 128 of the sea. Also included in the system can be a first control pod 130 (often referred to as the yellow control pod) and a second control pod 132 (often referred to as the blue control pod), and a hydraulic control unit 134. In the embodiment shown in FIG. 2, the first and second control pods 130, 132 are attached to the LMRP 118. The first control pod 130 and second control pod 132 can be controlled by first and second control cabinets 131, 133, located on the vessel 126. The vessel 126 can be any appropriate vessel, including, for example, a drill ship or a platform.

Under normal operations, the subsea BOP rams 113 are hydraulically controlled by the first or second pod 130, 132. Specifically, hydraulic lines 136 run from each of the first and second control pods 130, 132 to individual rams 113 of the BOP 112. Typically one of the two control pods 130, 132 is responsible to hydraulically control the rams 113 through its respective hydraulic lines 136, while the other control pod 130, 132 remains idle. In this way, redundancy is built into the system because if the control pod 130, 132 actually controlling the rams 113 becomes incapacitated, or otherwise requires maintenance or replacement, the other control pod 130, 132 can continue operation of the rams 113.

The embodiment of FIG. 2 is an alternate safety instrumented system for controlling the subsea BOP 112 that operates on a pod by pod basis. The safety instrumented system includes a surface logic solver 138, or logic controller, located at the vessel 126, and connected to a first subsea logic solver 140 by a first cable 142, and a second subsea logic solver 144 by a second cable 146. As shown in FIG. 2, the first subsea logic solver 140 and the second subsea logic solver 144 can each be connected to an extended input/output (I/O) extension 151 by cables 149, which I/O extension 151 is in communication with a hydraulic control unit 134 located in the lower stack 114. The surface logic solver 138 can include HMI panel 147 to allow an operator to communicate with the surface logic solver 138. In one embodiment, the HMI panel 147 can be a panel with push buttons and lit indicators, while other embodiments can include a touch screen display.

In practice, the surface logic solver 138 can generate commands, which are then transmitted to the first subsea logic solver 140 via the first communications cable 142, and/or to the second subsea logic solver 144 via the second cable 146. From the first subsea logic solver 140 and/or the second subsea logic solver 144, the commands are then transferred to the I/O extension 151, which communicates with, and may be attached to, the hydraulic control unit 134. The hydraulic control unit 134 is in turn in communication with the subsea BOP rams 113 via hydraulic lines 136. The I/O extension 151 can implement the commands, directing the hydraulic control unit 134 to control the subsea BOP rams 113 as desired by an operator.

In the embodiment shown in FIG. 2, each ram 113 can be connected to multiple hydraulic lines 136, each coming from a different control source, including the first control pod 130, the second control pod 132, and the hydraulic control unit 134. As shown, which line controls the BOP ram 113 at any given moment can be controlled by valves 139 attached to the BOP rams 113. In the drawings, hydraulic lines 136 are shown connecting each of the first and second control pods 130, 132 and the hydraulic control unit 134 to some, but not all, of the rams 113. It is to be understood that in a functioning system, each of the control components can be connected to all of the rams 113, and such a configuration is not shown in the drawing only to improve clarity of the figures.

As discussed in more detail above with respect to the embodiment of FIG. 1, allowing disconnection and subsequent reconnection of the LMRP 18 from the lower stack 14 can be very advantageous, such as to provide the ability to move the vessel 126, riser 124, and LMRP 118 out of the path of a storm. The disconnection and subsequent reconnection of the LMRP 18 to the lower stack 14 can be greatly simplified by reducing the number of connections between these components, and also by controlling the types of connections made.

One way to simplify the reconnection of the LMRP 118 and the lower stack 114 is to provide a pair of subsea logic solvers corresponding to the control pods 130, 132, and providing an I/O extension 151, as shown in FIG. 2 and described above. This is because the first and second cables 142, 146, which connect the surface logic solver 138 to the first and second subsea logic solvers 140, 144, respectively, must carry power and communications between the LMRP 118 and the lower stack 114. Often, the distance between the surface logic solver 138 and the LMRP 118 (and thus the first and second subsea logic solvers 140, 144) through the riser 124 can be very long, such as up to about 2 miles in length or more. Thus, power lines in the cable must be very high voltage lines, and the communications are often carried through optical lines.

If the system were equipped with a subsea logic solver in the lower stack, an operator would need to disconnect and reconnect both high voltage power lines and fragile optical communications lines between the LMRP 118 and the lower stack 114. Such connections could be dangerous (in the case of the high voltage power lines) and could degrade the quality of the communication signals (in the case of the optical communications lines). Alternatively, if the system were equipped only with single subsea logic solvers on the LMRP 118, without an I/O extension near the hydraulic control unit 134, multiple hydraulic lines would need to cross from the LMRP 118 to the lower stack 114 to connect to the rams 113. Such a structure could be problematic because of the need to disconnect and reconnect many more lines between these components.

By providing subsea logic solvers 140, 144 on the LMRP 118 and a separate I/O extension 134 on the lower stack 114, these problems can be alleviated. In practice, according to the present technology, the cables 142, 146 connecting the surface logic solver 138 to the first and second subsea logic solvers 140, 146 can include high voltage power lines and optical communication lines. One function of the first and second subsea logic solvers 140, 146 can be to convert and lower the voltages, and to convert the optical signals to copper, thereby allowing communication between the first and second subsea logic solvers 140, 146 and the I/O extension 151 to be through low voltage copper wires that make up cables 149. Such low voltage copper wire can more easily be disconnected and reconnected as needed at the interface between the LMRP 118 and the lower stack 114.

In some embodiments of the invention, the hydraulic control unit 134 can be connected to the hydraulic connector 120 to disconnect or reconnect the LMRP 118 from the lower stack 114. Since the hydraulic connector 120 is attached to the LMRP 118, a single hydraulic line 148 may need to cross the interface between the LMRP 118 and the lower stack 114 to provide hydraulic communication between the hydraulic control unit 134 and the hydraulic connector 120. Alternatively, use of such a line can be avoided in favor of providing power to the hydraulic connector 120 from an accumulator 150 which, in the embodiment shown, can be attached to the LMRP 118.

Control System for Safety Instrumented System of Present Technology

Figure 3:
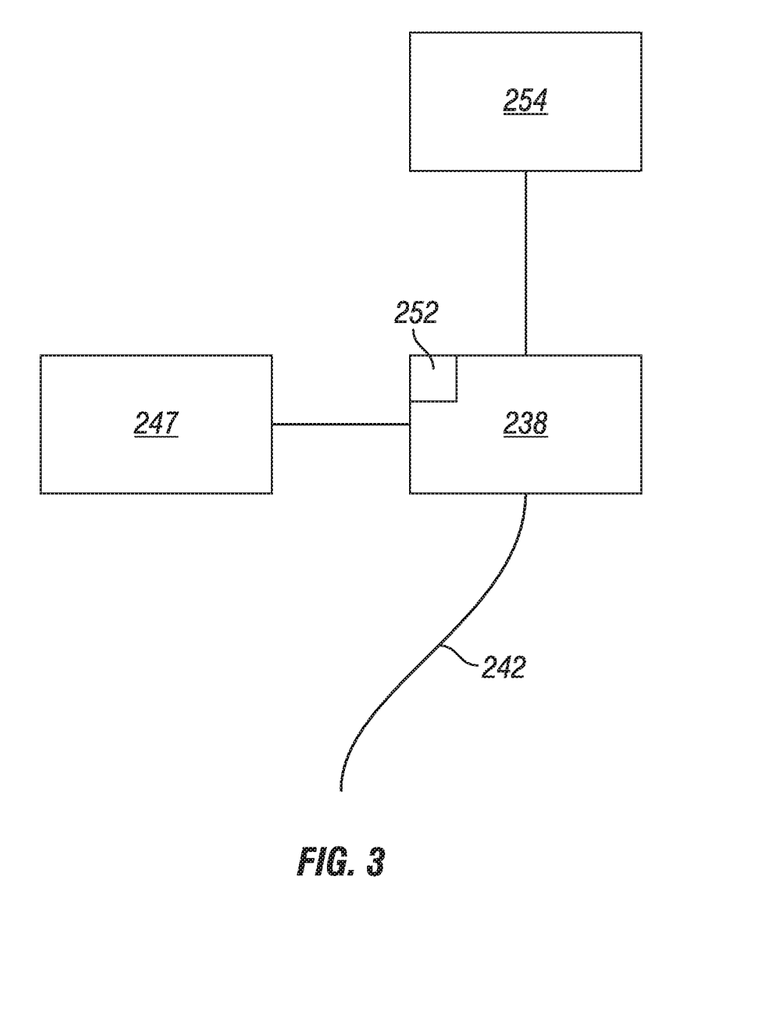
FIG. 3 shows a control system, including automatic and man-in-the loop controls, for the safety instrumented system of embodiments of the present technology.

FIG. 3 shows another aspect of the present technology, including the ability to alternate between a man-in-the-loop and an automatic configuration for controlling the surface logic solver 238, and hence the safety instrumented systems for controlling a subsea BOP described above. More particularly, the present technology provides a surface logic controller 238, which, among other things, can monitor the basic processes and controls of the BOP system, including the performance of the subsea logic solvers, the operation of the BOP rams, the operation of shuttle valves, pressure sensors, temperature sensors, and other components of the subsea system. To monitor the operation of the BOP rams, the surface logic controller 238 can monitor the operation of the control pods.

According to the embodiment of FIG. 3, the surface logic controller can be equipped with a key switch 252 capable of alternating between a man-in-the-loop state and an automatic state. The key switch can be a physical switch or can be software code integrated into the code of the logic solver.

When the key switch 252 is in the man-in-the-loop state, the surface logic solver 238, and hence the safety instrumented systems for controlling the subsea BOP, can be controlled by an operator who issues commands to the surface logic solver 238 through an HMI panel 247 or by other appropriate means. Thus, the operator will have full control over whether to initiate action using the safety instrumented system or not to initiate action.

Alternatively, when the key switch 252 is in the automatic state, an automatic controller 254 can used to control the subsea BOP through the safety instrumented systems described above. The automatic controller can act without prompting by the operator.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A control system for a subsea blowout preventer (BOP) positioned in a lower stack, the lower stack releasably engaged with a lower marine riser package (LMRP), the control system comprising:
    a surface logic solver positioned at or above the surface of the sea that generates first command signals comprising commands for operating the subsea BOP;
    a first subsea logic solver attached to the LMRP and in communication with the surface logic solver so that the first subsea logic solver receives the first command signals from the surface logic solver; and
    a second subsea logic solver attached to a hydraulic control unit in the lower stack, the hydraulic control unit connected to an accumulator and in hydraulic communication with the subsea BOP, the second subsea logic solver in communication with the first subsea logic solver so that the second subsea logic solver receives second command signals comprising the commands from the first subsea logic solver and implements the commands by activating the hydraulic control unit to operate the BOP.

2. The control system of claim 1, wherein the lower stack is attached to the LMRP by a hydraulic connector, and wherein the hydraulic control unit controls the hydraulic connector.

3. The control system of claim 1, wherein the lower stack is attached to the LMRP by a hydraulic connector, and wherein the hydraulic connector is powered by an accumulator.

4. The control system of claim 1, wherein the surface logic solver, the first subsea logic solver, and the second subsea logic solver, each comprise a central processing unit (CPU).

5. The control system of claim 1, wherein the surface logic solver comprises a central processing unit (CPU), and the first subsea logic solver or the second subsea logic solver, or both, comprise an extended input/output (I/O) card.

6. The control system of claim 1, wherein the surface logic solver is connected to the first subsea logic solver by a cable having high voltage wires and optical communication lines.

7. The control system of claim 6, wherein the first subsea logic solver is connected to the second subsea logic solver by a cable having low voltage wires and no optical communication lines.

8. The control system of claim 1, wherein the system further comprises:
    a human machine interface panel connected to the surface logic solver;
    an automatic controller in communication with the surface logic solver that automatically issues commands to the surface logic solver based on predetermined conditions detected by the surface logic solver; and
    a key switch having a first position and a second position, the first position opening communication between the surface logic solver and the human machine interface panel, and the second position opening communication between the surface logic solver and the automatic controller.

9. A redundant control system for a subsea blowout preventer (BOP) positioned in a lower stack, the lower stack removably engaged with a lower marine riser package (LMRP), and the LMRP having first and second control pods, each in hydraulic communication with the BOP to control the BOP, the control system comprising:
    a surface logic solver positioned at or adjacent the surface of the sea that generates first command signals comprising commands for operating the subsea BOP;
    a first subsea logic solver attached to the first control pod and in communication with the surface logic solver, the first subsea logic solver in communication with the first control pod so that the first subsea logic solver is capable of receiving the first command signals from the surface logic solver and implementing the commands in the first command signals by activating the first control pod to operate the BOP; and
    a second subsea logic solver attached to the second control pod and in communication with the surface logic solver, the second subsea logic solver in communication with the second control pod so that the second subsea logic solver is capable of receiving second command signals comprising second commands from the surface logic solver and implementing the second commands by activating the second control pod to operate the BOP.

10. The control system of claim 9, wherein the lower stack is attached to the LMRP by a hydraulic connector, and wherein the hydraulic connector is in communication with the first subsea logic solver and the second subsea logic solver.

11. The control system of claim 9, wherein the lower stack is attached to the LMRP by a hydraulic connector, and wherein the hydraulic connector is powered by an accumulator.

12. The control system of claim 9, wherein the surface logic solver, the first subsea logic solver, and the second subsea logic solver, each comprise a central processing unit (CPU).

13. The control system of claim 9, wherein the surface logic solver comprises a central processing unit (CPU), and the first subsea logic solver or the second subsea logic solver, or both, comprise an extended input/output (I/O) card.

14. The control system of claim 9, wherein the system further comprises:
    a human machine interface panel connected to the surface logic solver;
    an automatic controller in communication with the surface logic solver that automatically issues commands to the surface logic solver based on predetermined conditions detected by the surface logic solver; and a key switch having a first position and a second position, the first position opening communication between the surface logic solver and the human machine interface panel, and the second position opening communication between the surface logic solver and the automatic controller.

15. A method for controlling a subsea blowout preventer (BOP), the method comprising:
generating a first command signal comprising a command by a surface logic solver located at or adjacent the surface of the sea;
transmitting the first command signal to a first subsea logic solver attached to a lower marine riser package;
transmitting a second command signal comprising the command to a second subsea logic solver attached to a hydraulic control unit that is connected to an accumulator and that is in a lower stack, the hydraulic control unit in communication with the subsea BOP; and
operating the subsea BOP with the hydraulic control unit in accordance with the command in the second command signal.

16. The method of claim 15, wherein step (b) is carried out via an optical cable between the surface logic solver and the first subsea logic solver.

17. The method of claim 16, wherein step (c) is carried out via a copper wire between the first subsea logic solver and the second subsea logic solver.

18. The method of claim 17, further comprising the step of:
after step (b) and before step (c), converting the command signal from an optical signal to a copper signal.

* * * * *